United States Patent
Fujimori et al.

(10) Patent No.: US 7,202,323 B2
(45) Date of Patent: Apr. 10, 2007

(54) POLYCARBONATE RESIN

(75) Inventors: Takayasu Fujimori, Ibaraki (JP);
Makoto Matsumura, Ibaraki (JP);
Shingo Kanasaki, Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 193 days.

(21) Appl. No.: 10/820,808

(22) Filed: Apr. 9, 2004

(65) Prior Publication Data
US 2004/0230024 A1 Nov. 18, 2004

(30) Foreign Application Priority Data
May 15, 2003 (JP) .............................. 2003-137326

(51) Int. Cl.
*C08G 65/38* (2006.01)
(52) U.S. Cl. ...................... 528/219; 524/445; 524/449; 525/51; 525/63; 525/74
(58) Field of Classification Search ................ 524/445, 524/449; 525/51, 63, 74; 528/219
See application file for complete search history.

(56) References Cited

FOREIGN PATENT DOCUMENTS

| JP | 6-184424 | 7/1994 |
|---|---|---|
| JP | 2002-20610 | 1/2002 |

OTHER PUBLICATIONS

"Patent Abstracts of Japan" Abstract of JP No. 10 176046, Jun. 30, 1998, Teijin, Ltd.
Derwent Abstract of JP No. 61 213218, Sep. 22, 1986, Idemitsu Kosan Co., Ltd.

*Primary Examiner*—Terressa Boykin
(74) *Attorney, Agent, or Firm*—Sughrue Mion, PLLC

(57) ABSTRACT

A polycarbonate resin with a polystyrene-converted weight average molecular weight (Mw) of 20,000 to 200,000 obtained by forming a carbonate bond from a dihydroxy compound represented by the general formula (1), a dihydroxy compound represented by the general formula (2) and bis(hydroxyphenyl) methane and a carbonic acid diester or phosgene, having higher stiffness and better balance of mechanical properties than conventional aromatic polycarbonate resin to be derived from 2,2-bis(4-hydroxyphenyl) propane.

6 Claims, No Drawings

POLYCARBONATE RESIN

BACKGROUND OF THE INVENTION

1) Field of the Invention

The present invention relates to a novel polycarbonate resin with excellent heat resistance, good balance of mechanical properties and low birefringence.

2) Prior Art

At present, a polycarbonate resin made from 2,2-bis(4-hydroxyphenyl)propane (so-called bisphenol A) has been used in a wide field because it has high transparency, good balance of mechanical properties and high heat resistance. In detail, it has been applied to various materials including optical materials such as optical discs, prisms, optical lenses and optical films and transparent structural materials such as cups as a substitute of glass, transparent boards for putting into a window frame and transparent roof plates of arcade.

However, a polycarbonate resin made from bisphenol A has a defect that it cannot be applied in the field to require a stiffness of flexural elastic modulus more than 2300 MPa because it has a flexural elastic modulus of 2300 MPa. In order to increase its stiffness, it has been widely conducted to mix an inorganic filler(s) such as glass fiber, carbon fiber and boron nitride in it. However, there was a problem that such organic fillers cannot be applied in the field to require transparency since kneading of such inorganic fillers cause remarkable deterioration of transparency. For example, although there is a case that a glass with a refractive index difference of 0.01 or below is mixed in a polycarbonate resin, haze is large and transparency is quite insufficient (Japanese Patent Kokai (Laid-open) No. 6-184424). Further, although there is a case that a glass with a refractive index of 1.570 to 1.600 and a plasticizer are mixed in a polycarbonate resin, haze is large and transparency is quite insufficient (Japanese Patent Kokai (Laid-open) No. 2002-020610).

SUMMARY OF THE INVENTION

The present invention is to solve the above-mentioned problems of prior art and to provide a novel polycarbonate resin with high stiffness and good balance of mechanical properties, excellent heat resistance and low birefringence.

As a result of extensive to solve the above-mentioned prior art problems, the inventors have found that the above-mentioned problems can be solved by providing a polycarbonate resin having a polystyrene-converted weight average molecular weight (Mw) of 20,000 to 200,000 obtained by forming a carbonate bond from a dihydroxy compound represented by the following general formula (1), a dihydroxy compound represented by the following general formula (2) and at least one compound (6) selected from the group consisting of dihydroxy compounds represented by the following structural formulas (3), (4) and (5) and a carbonic acid diester or phosgene;

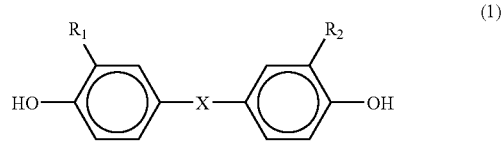
(1)

wherein $R_1$ and $R_2$ are, each independently, a hydrogen atom, an alkyl group having 1 to 8 carbon atoms, a cycloalkyl group having 5 to 20 carbon atoms, an alkoxyl group 1 to 8 carbon atoms, an aryl group having 6 to 10 carbon atoms or an aryloxy group having 6 to 10 carbon atoms and X is a single bond, an oxygen atom, a sulfur atom, a sulfonic group, an alkylidene group having 2 to 10 carbon atoms, a cycloalkylidene group having 5 to 12 carbon atoms, an arylalkylidene group having 7 to 15 carbon atoms, a fluorenylidene group or α, α, α', α'-tetramethylxylidene group;

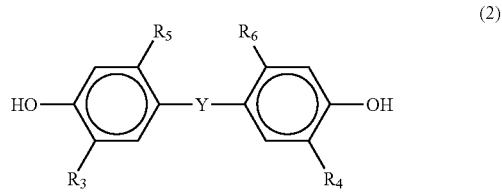
(2)

wherein $R_3$ and $R_4$ are, each independently, an alkyl group having 3 to 10 carbon atoms or a cycloalkyl group having 5 to 20 carbon atoms; $R_5$ and $R_6$ are, each independently a methyl group or an ethyl group and Y is a single bond, an oxygen atom, a sulfur atom, a sulfonic group, an alkylidene group having 1 to 8 carbon atoms, a cycloalkylidene group having 5 to 12 carbon atoms, an arylalkylidene group having 7 to 15 carbon atoms, a fluorenylidene group or α, α, α', α'-tetramethylxylidene group;

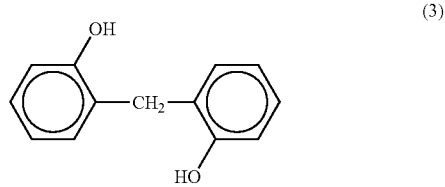
(3)

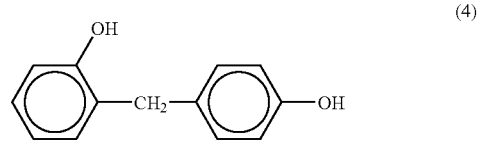
(4)

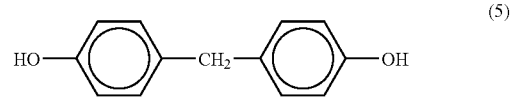
(5)

and have accomplished the present invention.

DETAILED DESCRIPTION OF THE INVENTION

The present invention will be described in more detail below.

The polycarbonate resin to be used in the present invention is a resin obtained by forming a carbonate bond from a dihydroxy compound represented by the above-mentioned general formula (1), a dihydroxy compound represented by the above-mentioned general formula (2) and at least one compound (6) selected from the group consisting of dihydroxy compounds represented by the structural formulas (3), (4) and (5) and a carbonic acid diester or phosgene.

Examples of the compound represented by the general formula (1) include 2,2-bis(4-hydroxyphenyl)propane (so-called bisphenol A), 2,2-bis(4-hydroxy-3-methylphenyl) propane, 2,2-bis(4-hydroxy-3-ethylphenyl)propane, 2,2-bis (4-hydroxy-3-isopropylphenyl)propane, 2,2-bis(4-hydroxy-3-(1-methylpropyl)phenyl)propane, 2,2-bis(4-hydroxy-3-tert-butylphenyl)propane, 2,2-bis(4-hydroxy-3-cyclohexylphenyl)propane, 2,2-bis(4-hydroxy-3-phenylphenyl)propane, 2,2-bis(4-hydroxylphenyl)butane, 2,2-bis(4-hydroxyphenyl)-3-methylbutane, 1,1-bis(4-hydroxyphenyl)cyclohexane, 1,1-bis(4-hydroxy-3-methylphenyl)cyclohexane, 1,1-bis(4-hydroxy-3-ethylphenyl)cyclohexane, 1,1-bis(4-hydroxy-3-(1-methylethyl)phenyl) cyclohexane, 1,1-bis(4-hydroxy-3-tert-butylphenyl) cyclohexane, 1,1-bis(4-hyroxy-3-(1-methylpropyl)phenyl) cyclohexane, 1,1-bis(4-hydroxy-3-cyclohexylphenyl) cyclohexane, 1,1-bis(4-hydroxy-3-phenylphenyl) cyclohexane, 9,9-bis(4-hydroxy-3-methylphenyl)fluorene, 4,4'-(1,3-phenylene-bis(1-methylethylidene))bisphenol, 4,4'-(1,4-phenylene-bis 1-methylethylidene))bisphenol, 4,4'-(1,3-phenylene-bis(1-methylethylidene))bis(2-methylphenol), 1,1-bis(4-hydroxyphenyl)cyclopentane, 1,1-bis (4-hydroxyphenyl) ethane, 1,1-bis(4-hydroxy-phenyl)-1-phenylethane, 4,4'-thiodiphenol, bis(4-hydroxyphenyl) sulfone, 1,1-bis(4-hydroxy-3-tert-butylphenyl)-1-phenylethane and 4,4'-dihydroxy-biphenyl, among which bispehnol A is preferable.

Examples of the compound represented by the general formula (2) include 1,1-bis(4-hydroxy-5-tert-butyl-2-methylphenyl)butane (so-called 4,4'-butylidenebis(3-methyl-6-tert-butylphenol)), 1,1-bis(4-hydroxy-5-isopropyl-2-methylphenyl)butane, 1,1-bis(4-hydroxy-5-cyclohexyl-2-methylphenyl)butane, 1,1-bis (4-hydroxy-5-tert-butyl-2-methylphenyl) cyclohexane, 1,1-bis(4-hydroxy-5-tert-butyl-2-methylphenyl)-1-phenylmethane, 4,4'-thiobis(3-methyl-6-tert-butylphenol), 4,4'-(1,3-phenylene-bis(1-methylethylidene))bis-(2-cyclohexyl-5-methylphenol) and 4,4'-(1, 4-phenylene-bis(1-methylethylidene))bis-(2-cyclohexyl-5-methylphenol), among which 4,4'-butylidenebis(3-methyl-6-tert-butylphenol) is preferable.

The compound represented by the structural formula (3) is 2,2'-methylenediphenol (so-called 2,2'-bisphenol F). The compound represented by the structural formula (4) is 2,4'-methylenediphenol (so-called 2,4'-bisphenol F). The compound represented by the structural formula (5) is 4,4'-methylenediphenol (so called 4,4'-bisphenol F).

The polycarbonate resin of the present invention includes a random-, block- or alternating copolymerization structure and exhibits good balance of mechanical properties, excellent heat resistance, flowability, transcription and molding properties. The polycarbonate resin of the present invention may contain small amount of other bisphenols in the range not to impair the above-mentioned properties. In detail, examples of other bisphenols include 2,2-bis(4-hydroxy-3, 5-dimethylphenyl)propane, bis(4-hydroxy-3,5-dimethylphenyl)methane and 3,3',5,5'-tetramethyl-4,4'-biphenol.

The glass transition temperature of the polycarbonate resin of the present invention is preferably 105 to 180° C. and more preferably 115 to 170° C. When the glass transition temperature is below 105° C., it is not preferable since heat resistance deteriorates and environment for use is restricted. When it is above 180° C., it is not preferable since molding conditions becomes tough due to degradation of flowability and silver streak due to decomposition occurs and furthermore when the polycarbonate resin is adjusted to a low molecular weight in order to secure flowability, it becomes brittle.

The polystyrene-converted weight average molecular (Mw) of the polycarbonate resin of the present invention is 20,000 to 200,000, preferably 30,000 to 120,000 and more preferably 35,000 to 80,000. It is not preferable since when Mw is below 20,000, a mold article to be formed becomes brittle, whereas above 200,000, molding conditions become tough due to degradation of flowability in a molten state.

The flexural elastic modulus of a molded article comprising the polycarbonate resin of the present invention is preferably more than 2400 MPa and more preferably 2500 to 4000 MPa. Its flexural strength is preferable more than 85 MPa and more preferably 92 to 150 MPa. When the flexural elastic modulus is 2400 MPa or below, it is not preferable since the molded article becomes readily flexible. Further, when the flexural strength is 85 MPa or below, it is not preferable since the molded article comes to crack readily.

In the present invention, the compound (6) is used in addition to the compound represented by the general formula (1) and the compound represented by the general formula (2). The compound (6) is at least one compound selected from the group consisting of dihydroxy compounds represented by the structural formulas (3), (4) and (5) (hereinafter, abbreviated as each "(3)", "(4)" and "(5)"). However, it is preferable to contain (3) or (4) from the viewpoint of improvement in flexural elastic modulus. Therefore, in detail, it is preferable to apply the combination of (3), (4), (3)+(4), (3)+(5), (4)+(5) or (3)+(4)+(5) to the compound (6) (hereinafter, abbreviated "(6)"), among which the combination of (3)+(4) or (3)+(4)+(5) is more preferable. The ratio of (3), (4) and (5) is not limited. It is preferable that the ratio of (5) to (6) is 0.7 or below.

Regarding the ratio of the compound represented by the general formula (1) (hereinafter, abbreviated as "(1)") and the compound represented by the general formula (2) (hereinafter, abbreviated as "(2)") and (6), the molar ratio of (1)/[(1)+(2)] is preferably 0.1 to 0.9 and more preferable 0.2 to 0.8. The molar ratio of (6)/[(1)+(2)+(6)] is preferably 0.01 to 0.6 and more preferably 0.1 to 0.4.

The process for producing the polycarbonate resin of the present invention is described below. As one of the processes for producing it, a known melt polycondensation process comprising reacting a dihydroxy compound and a carbonic acid diester in the presence of a basic catalyst is applied.

Examples of carbonic acid diester include diphenyl carbonate, ditolyl carbonate, bis(chlorophenyl)carbonate, m-cresyl carbonate, dimethyl carbonate, diethyl carbonate, dibutyl carbonate and dicyclohexyl carbonate, among which diphenyl carbonate is preferable. Carbonic acid diester is used in a molar ratio of preferably 0.97 to 1.20 and more preferably 0.99 to 1.10 per total 1 mol of dihydroxy compounds.

Examples of basic compound catalyst include alkaline metal compounds and/or alkaline earth metal compounds and nitrogen-containing compounds.

As the basic compound, organic acid salts, inorganic acid salts, oxides, hydroxides, hydrides or alkoxides of alkali metal and alkaline earth metal, quaternary ammonium hydroxides and salts thereof and amines are preferably used. One kind of above-mentioned compound or a mixture of above-mentioned compounds can be used.

Examples of the alkali metal compounds include sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium hydroborate, sodium phenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, each disodium salt, dipotassium salt, dicesium salt and dilithium salt of bisphenol A and each sodium salt, potassium salt, cesium salt and lithium salt of phenol.

Examples of the alkaline earth metal compounds include magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenylphosphate.

Examples of the nitrogen-containing compound include quaternary ammonium hydroxides having alkyl group or aryl group including tetramethylammonium hydroxide, tetraethylammonium hydroxide, tetrapropylammonium hydroxide, tetrabutylammonium hydroxide and trimethyl benzylammonium hydroxide, tertiary amines including triethyl amine, dimethylbenzilamine and triphenylamine, secondary amines including diethylamine and dibutylamine, primary amines including propylamine and butylamine, imidazoles including 2-methylimidazole, 2-phenylimidazole and benzoimidazole and bases or basic salts including ammonia, tetramethylammonium borohydride, tetrabutylammonium borohydride, tetrabutylammonium tetraphenylborate and tetraphenylammonium tetraphenylborate.

The catalyst is used in a molar ratio of $10^{-9}$ to $10^{-3}$ mol and preferably $10^{-7}$ to $10^{-5}$ mol per total 1 mol of the dihydroxy compounds.

The melt polycondensation of the present invention is performed by transesterification with heating under atmospheric pressure or a reduced pressure using above-mentioned raw materials and catalyst while removing by-products. The reaction is usually performed in multiple stages of two stages or above.

In detail, the first stage reaction is performed at a temperature of 120 to 260° C. and preferably 180 to 240° C. for 0.1 to 5 hours and preferably 0.5 to 3 hours. Then, the reaction of the dihydroxy compounds and carbonic acid diester is performed while increasing the degree of reduced pressure in the reaction system and raising the reaction temperature and finally polycondensation is performed under a reduced pressure of 1 mm Hg or below at a temperature of 200 to 350° C. for 0.3 to 10 hours. Such reaction may be performed in a continuous process or in a batch wise. The reaction apparatus to be used in abovementioned reaction may be a vertical type reaction apparatus equipped with anchor type stirring blade, maxblend stirring blade, or helicalribbon type stirring blade, etc., a horizontal type reaction apparatus equipped with paddle blade, lattice blade, spectacle shaped blade or an extruder type reaction apparatus equipped with a screw and it is suitable to use a combination of above-mentioned reaction apparatuses considering a viscosity of the polymer.

In the process of producing the polycarbonate resin after the completion of the polymerization reaction, the catalyst is removed or deactivated in order to maintain heat stability and hydrolysis stability of the polycarbonate resin thus obtained. Usually, a method for deactivating a catalyst by addition of known acid substance is suitably applied.

Preferable examples of the acid substance include aromatic sulfonic acids including p-toluene sulfonic acid and dodecylbenzene sulfonic acid, aromatic sulfonic acid esters including butyl p-toluene-sulfonate, hexyl p-toluenesulfonate, octyl p-toluenesulfonate, phenyl p-toluenesulfonate and phenethyl p-toluenesulfonate, aromatic sulfonic acid salts including p-toluene sulfonic acid tetrabutyl phosphonium salt, organic halides including stearyl chloride, benzoyl chloride and p-toluene-sulfonyl chloride, alkyl sulfates including dimethyl sulfate and organic halides including benzyl chloride. They are suitably used.

After the deactivation of the catalyst, a step to remove low boiling point compounds in the polymer with vaporization under a pressure of 0.1 to 1 mm Hg at a temperature of 200 to 350° C. may be added. For its purpose, a horizontal apparatus equipped with a stirring blade with excellent surface renewing capacity such as paddle blade, lattice blade, spectacle blade, etc. or thin film vaporizer is suitably used.

As the second process for producing a polycarbonate resin in the present invention, an interfacial polymerization process comprising reacting dihydroxy compounds and phosgene in the presence of a solvent, an end terminating agent and an acid binder is applied. Usually, dihydroxy compounds and an end terminating agent are dissolved in an aqueous solution of acid binder and then the reaction is performed in the presence of a solvent.

Preferable examples of the acid binder includes pyridine, hydroxides of alkaline metal such as sodium hydroxide and potassium hydroxide. Preferable examples of the solvent include methylene chloride, chloroform, chlorobenzene and xylene. As a catalyst to promote the polymerization reaction, tertiary amines such as triethylamine or quaternary ammonium salts such as tetra-n-butylammonium bromide are used.

Examples of the end terminating agent to be used for adjustment of polymerization degree include monofunctional hydroxy compounds such as phenol, p-tert-butyl phenol, p-cumyl phenol and long chain alkyl-substituted phenol.

Further, if necessary, a small amount of antioxidants such as sodium sulfite and sodium hydrosulfite may be added.

The reaction is performed usually in the range of 0 to 150° C. and preferably in the range of 5 to 40° C. The reaction time depends on the reaction temperature and is usually 0.5 minutes to 10 hours and preferably 1 minute to 2 hours. It is preferable to maintain pH of the reaction system to 10 or above during the reaction.

Other antioxidants, an ultraviolet absorber, a releasing agent, a flowability improving agent, an antistatic agent, a lubricating agent, dye, pigment and an antibacterial agent may be suitably added to the polycarbonate resin of the present invention.

PREFERRED EMBODIMENT OF THE INVENTION

The present invention will be described in more detail below, referring to Examples, which are not intended to limit the scope of the present invention.

The properties of the polycarbonate resins were measured according to the following methods.

[Polystyrene-Converted Weight Average Molecular Weight (Mw)]

The measurement was performed by GPC (Gel Permeation Chromatography) using chloroform as a developing solvent. The calibration curve for polystyrene conversion was made using polystyrene with small dispersion having a known molecular weight as a standard substance.

[Glass Transition Temperature (Tg)]

The measurement was performed by a Differential Scanning Calorimeter (DSC).

[Photoelastic Constant]

A cast film with thickness 100 μm was prepared using methylene chloride as a solvent. The measurement was performed by Elliposometer, manufactured by Mizojiri Optical Co., Ltd, Japan.

[Bending Test Piece]

Bending test piece was prepared by injection molding with MIN7, manufactured by Niigata Tekko k.k., Japan. The size of the bending test piece is length 89 mm, width 12.65 mm and height 3.23 mm.

[Flexural Elastic Modulus and Flexural Strength]

The measurement was performed by Autograph AG-5000 B, manufactured by Shimazu Seisakusho k.k., Japan.

EXAMPLE 1

4.109 kg (18.00 mol) of 2,2-bis(4-hydroxyphenyl)propane, 6.887 kg (18.00 mol) of 4,4'-butylidenebis(3-methyl-6-tert-butylphenol), 1.802 kg (9.000 mol, the proportion; 2,2'-bisphenol F 16.6%, 2,4'-bisphenol F 48.3% 4,4'-bisphenol F 35.1%) of bisphenol F composition, 10.41 kg (48.60 mol) of diphenyl carbonate and 0.01890 g (2.250×10$^{-4}$ mol) of sodium hydrogencarbonate were charged to a reactor of 50L, equipped with a stirrer and a distiller and heated to 200° C. over one hour in nitrogen atmosphere of 760 Torr.

Then, its interior reduced pressure degree was adjusted to 100 Torr over 20 minutes and the conditions of 200° C. and 100 Torr were maintained for 50 minutes to perform transesterification reaction. The reduced pressure degree was further adjusted to 15 Torr over 10 minutes and simultaneously its interior temperature was raised up to 235° C. at the rate of 60° C./hr and the temperature and the pressure were maintained for 40 minutes to perform transesterification reaction. Then, the reduced pressure degree was adjusted to 1 Torr or below over 20 minutes and simultaneously the temperature was raised up to 265° C. at the rate of 90° C./hr and polymerization was performed for 60 minutes with stirring under the conditions of 265° C. and 1 Torr or below. After the completion of the reaction, nitrogen was injected into the reactor to apply a pressure and a polycarbonate resin thus produced was withdrawn while pelletizing it.

The polycarbonate resin thus obtained had Mw=52,900, Tg=145° C. and photoelastic constant=52×10$^{-12}$ m$^2$/N.

10.0 kg of the polycarbonate resin was vacuum dried for 24 hours at 100° C. and then 25 ppm (10 times mol to sodium hydrogencarbonate in the polycarbonate resin) of n-hexyl p-toluene-sulfonate was added to the polycarbonate resin and kneaded with an extruder to pelletize, whereby a pellet were obtained. This pellet had Mw=52,500.

The pellet was vacuum dried for 3 hours at 120° C. and then injection molded with MIN7 at a cylinder temperature of 270° C. and at a mold temperature of 92° C., whereby a bending test piece was obtained.

The bending test piece presented good appearance. The bending test piece was standing for 48 hours in the state of 25° C. and 50% RH and then its mechanical properties were measured by Autograph. The flexural elastic modulus was 2700 MPa and the flexural strength was 92 MPa (yield). Thus, stiffness was high.

EXAMPLE 2

4.109 kg (18.00 mol) of 2,2-bis(4-hydroxyphenyl)propane, 6.887 kg (18.00 mol) of 4,4'-butylidenebis(3-methyl-6-tert-butylphenol), 1.802 kg (9.000 mol, the proportion: 2,2'-bisphenol F 48.0%, 2,4'-bisphenol F 52.0% and 4,4'-bisphenol F 0.0%) of bisphenol F composition, 50L (sodium hydroxide 90.00 mol) of 7.2% sodium hydroxide aqueous solution and 22.17 g (0.1267 mol) of sodium hydrosulfite were charged to a reactor of 110 L, equipped with a phosgene injection nozzle and a cooler and dissolved with stirring. 28.7 L of methylene chloride, 1.826 L (sodium hydroxide 0.02214 mol) of 48.5% sodium hydroxide aqueous solution, 356.1 g (2.370 mol) of p-tert-butylphenol as a molecular weight modifier and 327.6 ml (2.353 mol) of triethylamine as a catalyst were further added thereto with stirring.

5.734 kg (49.90 mol) of phosgene was injected into the mixed liquid thus obtained with stirring over 3 hours while maintaining the temperature of the mixed liquid to 25° C.

After the completion of injection, stirring was conducted for 3 hours at 25° C. to complete the reaction. Stirring was stopped and methylene chloride layer was separated from the mixed liquid and water washing was repeated 5 times.

Then, n-heptane corresponding to 25% by weight of methylene chloride solution was added thereto and mixed and then the mixed solution thus obtained was added dropwise to warm water and its temperature was raised up to 100° C. to distil off the solvent, whereby a slurry polycarbonate resin powder was obtained.

The polycarbonate resin powder was filtered and dried for 8 hours at 110° C. Thus, a polycarbonate resin of 13.0 kg was obtained. The polycarbonate resin thus obtained had Mw=53,200, Tg=140° C. and photoelestic constant=49×10$^{-12}$ m$^2$/N. 10.0 kg of the polycarbonate resin was vacuum dried for 24 hours at 100° C. and then changed to a strand through an extruder to pelletize, whereby a pellet was obtained. The pellet had Mw=53,000.

The pellet thus obtained was vacuum dried for 3 hours at 120° C. and then injection molded at a cylinder temperature of 270° C. and at a mold temperature of 82° C. with MIN7, whereby a bending test piece was obtained.

The bending test piece presented good appearance. The bending test piece was standing for 48 hours in the state of 25° C. and 50% RH and then its mechanical properties were measured by Autograph. The flexural elastic modulus was 2800 MPa and the flexural strength was 97 MPa (yield). Thus, stiffness was high.

COMPARATIVE EXAMPLE 1

The experiment was performed in the same manner as in Example 1 except that 5.137 kg (22.50 mol) of 2,2-bis(4-hydroxyphenyl)propane and 8.608 kg (22.50 mol) of 4,4'-butylidenebis(3-methyl-6-tert-butylphenol) were used and bisphenol F composition was not used and the polymerization was performed with stirring for 85 minutes under the conditions of 265° C. and 1 Torr or below.

After the completion of the reaction, a polycarbonate resin thus obtained had Mw=50,900, Tg=160° C. and photoelastic constant=52×10$^{-12}$ m$^2$/N.

A pellet was obtained from the polycarbonate resin in the same manner as in Example 1. The pellet had Mw=50,700.

The pellet thus obtained was vacuum dried for 3 hours at 120° C. and then injection molded at a cylinder temperature of 280° C. and at a mold temperature of 100° C. with MIN7, whereby a bending test piece was obtained.

The bending test piece presented good appearance. The bending test piece was standing for 48 hours in the state of 25° C. and 50% RH and then its mechanical properties were measured by Autograph. The flexural elastic modulus was 2200 MPa and the flexural strength was 80 MPa (yield). Thus, stiffness was low.

COMPARATIVE EXAMPLE 2

The experiment was performed in the same manner as in Example 1 except that both 4,4'-butylidenebis (3-methyl-6-tert-butylphenol) and bisphenol F composition were not used and 10.27 kg (45.00 mol) of 2,2-bis(4-hydroxyphenyl)propane (bisphenol A) was used. After the completion of the reaction, a polycarbonate resin thus obtained had Mw=51,400, Tg=151° C. and photoelastic constant=78×10$^{-12}$ m$^2$/N.

A pellet was obtained from the polycarbonate resin in the same manner as in Example 1. The pellet had Mw=51,200.

The pellet thus obtained was vacuum dried for 3 hours at 120° C. and then injection molded at a cylinder temperature of 290° C. and at a mold temperature of 105° C. with MIN7, whereby a bending test piece was obtained.

The bending test piece presented good appearance. The bending test piece was standing for 48 hours in the state of 25° C. and 50% RH and then its mechanical properties were measured by Autograph. The flexural elastic modulus was 2300 MPa and the flexural strength was 85 MPa (yield). Thus, stiffness was low.

According to the present invention, a novel, transparent and useful polycarbonate resin with higher stiffness than conventional polycarbonates resin made form bisphenol A can be obtained. The polycarbonate resin can be applied to not only optical materials including optical disc, prism, optical lens and optical film from its low birefringence, but also to structural materials including cup and transparent resin board.

What is claimed is:

1. A polycarbonate resin of a polystyrene-converted weight average molecular weight (Mw) of 20,000 to 200,000 obtained by forming a carbonate bond from a dihydroxy compound represented by the following general formula (1), a dihydroxy compound represented by the following general formula (2) and at least one compound (6) selected from the group consisting of dihydroxy compounds represented by the following structural formulas (3), (4) and (5) and a carbonic acid diester or phosgene;

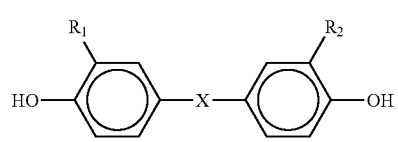
(1)

wherein $R_1$ and $R_2$ are, each independently, a hydrogen atom, an alkyl group of 1 to 8 carbon atoms, a cycloalkyl group of 5 to 20 carbon atoms, an alkoxyl group of 1 to 8 carbon atoms, an aryl group of 6 to 10 carbon atoms or an aryloxy group of 6 to 10 carbon atoms and X is a single bond, an oxygen atom, a sulfur atom, a sulfonic group, an alkylidene group of 2 to 10 carbon atoms, a cycloalkylidene group of 5 to 12 carbon atoms, an arylalkylidene group of 7 to 15 carbon atoms, a fluorenylidene group or an α, α, α', α'-tetramethylxylidene group;

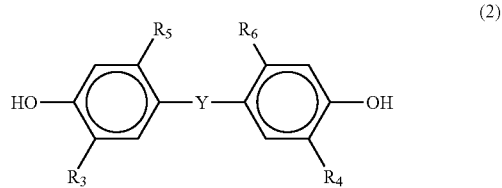
(2)

wherein $R_3$ and $R_4$ are, each independently, an alkyl group of 3 to 10 carbon atoms or a cycloalkyl group of 5 to 20 carbon atoms; $R_5$ and $R_6$ are, each independently, a methyl group or an ethyl group and Y is a single bond, an oxygen atom, a sulfur atom, a sulfonic group, an alkylidene group of 1 to 8 carbon atoms, a cycloalkylidene group of 5 to 12 carbon atoms, an arylalkylidene group of 7 to 15 carbon atoms, a fluorenylidene group or an α, α, α', α'-tetramethylxylidene group;

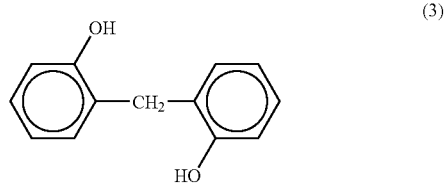
(3)

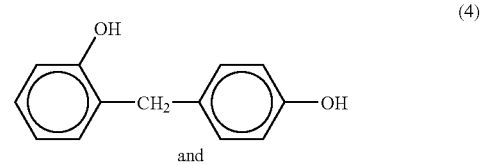
(4)

and

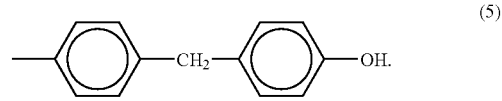
(5)

2. The polycarbonate resin according to claim 1, wherein a ratio of the dihydroxy compound represented by the structural formula (5) to the compound (6) is 0.7 or below.

3. The polycarbonate resin according to claim 1, wherein each $R_1$ and $R_2$ are a hydrogen atom and X is an isopropylidene group in the general formula (1).

4. The polycarbonate resin according to claim 1, wherein each $R_3$ and $R_4$ are a tert-butyl group and each $R_5$ and $R_6$ are a methyl group in the general formula (2).

5. The polycarbonate resin according to claim 1, wherein Y is a butylidene group in the general formula (2).

6. The polycarbonate resin according to claim 1 of a glass transition temperature (Tg) of 105 to 180° C. and a flexural elastic modulus more than 2400 MPa.

* * * * *